United States Patent
Koenig et al.

(10) Patent No.: US 10,110,156 B2
(45) Date of Patent: Oct. 23, 2018

(54) REDUCING FAULT ENERGY FROM AN ELECTRIC MOTOR DRIVE FOR A COMPRESSOR

(71) Applicant: HAMILTON SUNDSTRAND CORPORATION, Charlotte, NC (US)

(72) Inventors: Andreas C. Koenig, Rockford, IL (US); John M. Beck, Windsor, CT (US); Joseph Kenneth Coldwate, Roscoe, IL (US)

(73) Assignee: Hamilton Sunstrand Corporation, Charlotte, NC (US)

( * ) Notice: Subject to any disclaimer, the term of this patent is extended or adjusted under 35 U.S.C. 154(b) by 382 days.

(21) Appl. No.: 15/011,711

(22) Filed: Feb. 1, 2016

(65) Prior Publication Data
US 2017/0222592 A1  Aug. 3, 2017

(51) Int. Cl.
| | |
|---|---|
| *F04D 27/00* | (2006.01) |
| *H02P 29/024* | (2016.01) |
| *H02K 1/27* | (2006.01) |
| *F04D 15/00* | (2006.01) |
| *F04D 15/02* | (2006.01) |

(52) U.S. Cl.
CPC ........ *H02P 29/024* (2013.01); *F04D 15/0066* (2013.01); *F04D 15/0077* (2013.01); *F04D 15/0281* (2013.01); *F04D 27/009* (2013.01); *H02K 1/27* (2013.01)

(58) Field of Classification Search
CPC . F04D 27/008; F04D 27/0261; F04D 27/0292
See application file for complete search history.

(56) References Cited

U.S. PATENT DOCUMENTS

| | | | | |
|---|---|---|---|---|
| 4,046,490 | A * | 9/1977 | Rutshtein | F04D 27/0207 415/1 |
| 4,900,231 | A * | 2/1990 | Kennedy | B64D 41/00 417/16 |
| 5,066,197 | A * | 11/1991 | Champagne | F04D 27/0292 384/100 |
| 5,819,524 | A * | 10/1998 | Bosley | F01D 5/04 60/39.465 |
| 5,881,564 | A * | 3/1999 | Kishimoto | F04D 27/0292 418/102 |
| 5,897,299 | A * | 4/1999 | Fukunaga | F04D 29/057 417/310 |
| 6,870,279 | B2 * | 3/2005 | Gilbreth | H02J 1/10 290/52 |

(Continued)

FOREIGN PATENT DOCUMENTS

EP    1640673 A2    3/2006

OTHER PUBLICATIONS

European Search Report for European Application No. 17153713.7 dated May 24, 2017.

*Primary Examiner* — Patrick Hamo
(74) *Attorney, Agent, or Firm* — Carlson, Gaskey & Olds, P.C.

(57) ABSTRACT

A system has an electric motor having a stator and a rotor. The rotor rotates with a shaft and the shaft drives a fluid rotor. A control senses a fault condition on the electric motor. The control actuates a speed reduction feature when a fault is detected to bring rotation of the motor rotor and the fluid rotor to a stop more rapidly than if the speed reduction feature had not been actuated.

18 Claims, 1 Drawing Sheet

(56) References Cited

U.S. PATENT DOCUMENTS

| | | | |
|---|---|---|---|
| 8,118,545 B2 | 2/2012 | Chapman et al. | |
| 9,347,454 B2 * | 5/2016 | Serbruyns | F04D 27/0292 |
| 9,879,688 B2 * | 1/2018 | Mirsky | F04D 27/0292 |
| 2008/0131288 A1 * | 6/2008 | Kozaki | F04D 19/042 |
| | | | 417/32 |
| 2010/0074725 A1 | 3/2010 | Serbruyns | |
| 2010/0198480 A1 * | 8/2010 | Mertens | F04D 27/001 |
| | | | 701/100 |
| 2011/0318818 A1 | 12/2011 | Jeong et al. | |
| 2013/0230409 A1 * | 9/2013 | Zywiak | B64D 13/06 |
| | | | 417/2 |
| 2014/0030070 A1 | 1/2014 | Beers et al. | |
| 2015/0000247 A1 * | 1/2015 | Pandey | F04D 27/001 |
| | | | 60/39.091 |
| 2015/0107289 A1 * | 4/2015 | Sun | F25B 1/053 |
| | | | 62/324.6 |
| 2017/0074275 A1 * | 3/2017 | Thornton | F25B 1/053 |

* cited by examiner

REDUCING FAULT ENERGY FROM AN ELECTRIC MOTOR DRIVE FOR A COMPRESSOR

BACKGROUND OF THE INVENTION

This application relates to a method and control for reducing fault energy from an electric motor powering a rotor.

Electric motors are known and utilized to power a number of different articles. One type of electric motor is a permanent magnet motor. In a permanent magnet motor, a motor rotor is provided with permanent magnets.

These motors are becoming widely utilized for high power fan and compressor drive applications. The permanent magnet motors typically offer improved efficiency and can be smaller in size and weight as compared to more standard variable reluctance or induction motors.

There are a number of systems utilized within fan and compressor assemblies. One type system is a variable diffuser, which may adjust position and aperture size based upon signals from a control. The diffuser may be adjusted based upon ambient temperature, altitude (when used in aerospace applications), pressure, flow demand, and other operating conditions. Variable diffusers improve the overall efficiency of the compressor, and the torque demand on the motor.

One application is for a compressor to deliver air into applications on an aircraft, such as air supply for an aircraft cabin. In such a compressor, there is a "add heat supply." The add heat supply routes air from a compressor outlet through a selectively open valve into a chamber that delivers the air back to the inlet to the compressor. By recirculating some of the air which has been previously heated by the compressor, the temperature of the air delivered to the application, such as an aircraft cabin, is raised.

One challenge with permanent magnet motors occurs during a fault condition.

Should a winding fault, such as a "short circuit," be detected, a controller will act to shut the motor down. A winding short in many motor types is a fairly benign occurrence. However, in a permanent magnet motor, a gradual spin down of the rotor will cause the motor to act as a generator and feed energy to the fault until the rotational assembly finally comes to rest. This may be undesirable.

SUMMARY OF THE INVENTION

A system has an electric motor having a stator and a rotor. The rotor rotates with a shaft and the shaft drives a fluid rotor. A control senses a fault condition on the electric motor. The control actuates a speed reduction feature when a fault is detected to bring rotation of the motor rotor and the fluid rotor to a stop more rapidly than if the speed reduction feature had not been actuated.

These and other features may be best understood from the following drawings and specification.

DETAILED DESCRIPTION

Figure 1:
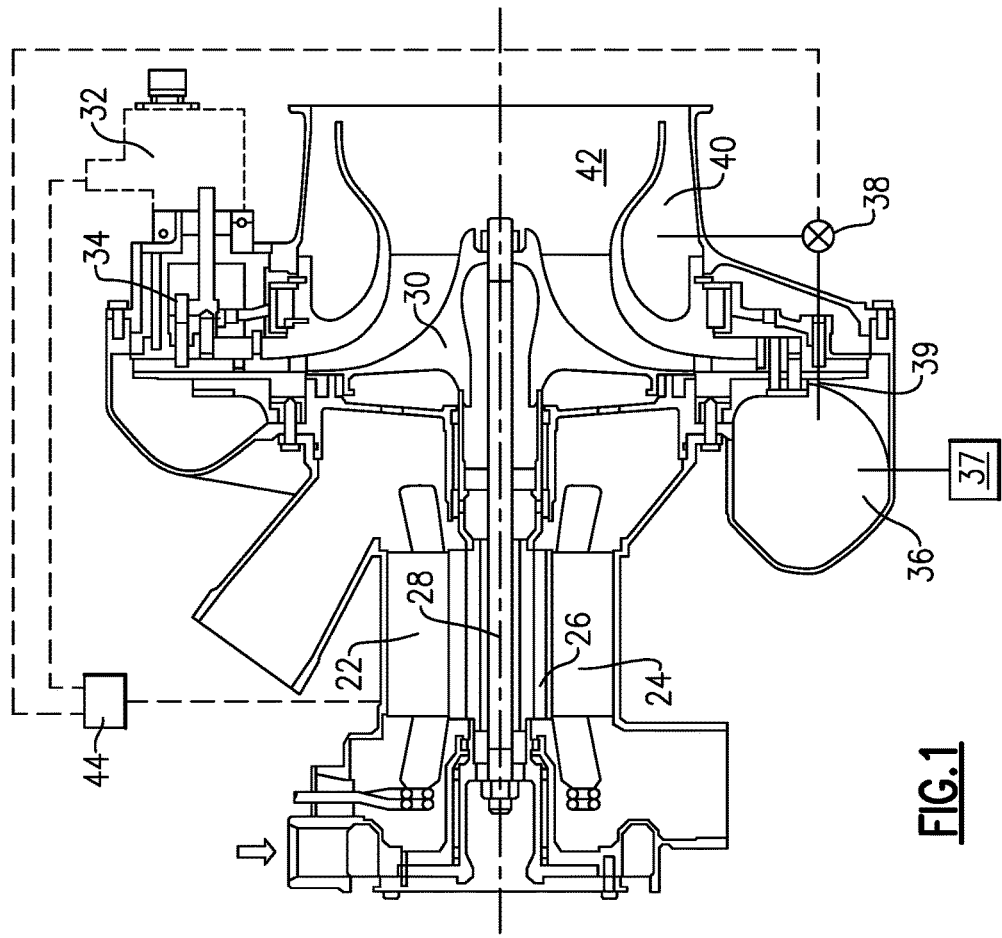
FIG. 1 shows a motor and compressor system.

FIG. 1 shows a compressor and an electric motor assembly 20. The electric motor 22 includes a stator 24 and a motor rotor 26. The motor rotor 26 may be a permanent magnet rotor. The motor rotor 26 rotates with shaft 28 that, in turn, drives a compressor impellor 30. The compressor impellor 30 is associated with a variable diffuser actuator 32 driving variable diffuser 34 downstream of a compressor outlet 36. The variable diffuser is controlled by the actuator 32 to alter the flow area downstream of the compressor outlet 36.

While a fluid rotor 30 is shown herein as a compressor impeller, the teachings of this disclosure may benefit systems driving other fluid rotor types.

The compressor outlet 36 may deliver air to a use 37, which may be a cabin on an aircraft. An add heat supply valve 38 is schematically shown communicating air from a tap line 39, which taps air from the outlet 36, into a chamber 40. Chamber 40 delivers the air back to an inlet 42 to the impellor 30. By selectively passing a portion of the air through the valve 38 back to inlet 42, the temperature of the air delivered to the outlet 36 is raised. This may be utilized during cold temperature operation of an associated aircraft to provide warmer air to the cabin. Further, this valve 38 may be opened to control stall or surge conditions.

As mentioned above, should a fault occur on the motor 22, a control 44 will be able to sense the fault. Sensing such a condition may be performed as generally known in the art.

Should a fault be detected, the control 44 stops supply of current to stator 22. Control 44 also controls a speed reduction feature to more rapidly reduce the speed of the rotating impellor 30. As can be appreciated, the rotor 26, shaft 28, and impellor 30 will have a relatively high inertia when the supply of power to the stator 22 is initially stopped by the control 44 having identified a fault. By the control 44 operating the speed reduction feature, the inertia is addressed and the impellor 30 and rotor 26 come to a stop more rapidly.

One such speed reduction feature is the variable diffuser 34. The control 44 may control the actuator 32 to move the diffuser to a position that will more rapidly reduce the speed of the rotating components 26/28/30. In general, moving the diffuser to a more open position will cause the speed of the rotating components to decrease more rapidly.

In another embodiment, which may be used in combination with the control of the variable diffuser, or separately, the valve 38 is opened to deliver compressed air back to the inlet 42. This will also bring the rotation of the components 26/28/30 to a stop more rapidly.

Figure 2:
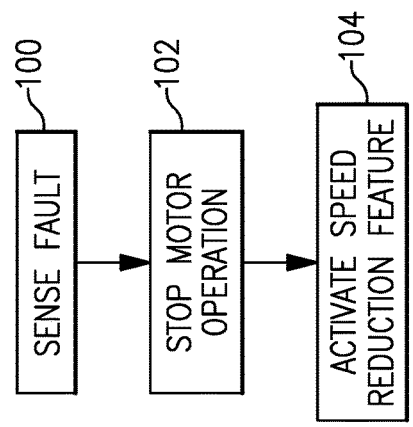
FIG. 2 shows a flow chart for a method and control according to this disclosure.

FIG. 2 is a flowchart of a method associated with this disclosure. At step 100, a control 44 senses a fault associated with a motor 22.

Upon sensing the fault, the control next stops operation of the motor at step 102. In general, the supply of current is interrupted.

In addition, at step 104, the control 44 actuates a speed reduction feature. As mentioned above, this could be the diffuser 34, the add heat valve 38, the combination of the two, or some other step, which would hasten the impeller 30 and motor rotor 26 to come to a stop after the supply of current has been interrupted.

In this manner, the problems mentioned above of a system 20 having a motor 22 in fault condition while the rotor 26 continues to rotate and provide the generator function is reduced.

Although an embodiment of this invention has been disclosed, a worker of ordinary skill in this art would recognize that certain modifications would come within the
}

The invention claimed is:

1. A system comprising:
an electric motor having a stator and a motor rotor, said motor rotor rotating with a shaft, and said shaft driving a fluid rotor;
a control for sensing a fault condition on said electric motor, and said control being configured to stop flow of current in response to a fault being detected, and to actuate a speed reduction feature in response to the fault to bring rotation of said motor rotor and said fluid rotor to a stop;
said motor rotor is a permanent magnet rotor; and
said speed reduction feature being at least one of moving a variable diffuser for the fluid rotor to a more open position or opening a valve to deliver air from an outlet of the fluid rotor into an inlet of the fluid rotor.

2. The system as set forth in claim 1, wherein said fluid rotor is a compressor impeller.

3. The system as set forth in claim 1, wherein said speed reduction feature is moving the variable diffuser for the fluid rotor to a more open position.

4. The system as set forth in claim 3, wherein the speed reduction feature also includes opening the valve to port air from an outlet of said fluid rotor into an inlet of said fluid rotor.

5. The system as set forth in claim 1, wherein the speed reduction feature is opening the valve to deliver air from an outlet of said fluid rotor into an inlet of said fluid rotor.

6. The system as set forth in claim 5, wherein said valve is an add heat valve.

7. An air supply system on an aircraft comprising:
a motor having a stator and a motor rotor, said motor rotor rotating with a shaft, and said shaft driving a compressor impeller;
a control for sensing a fault condition on said electric motor, and said control being configured to stop flow of current in response to a fault being detected, and to actuate a speed reduction feature in response to the fault to bring rotation of said motor rotor and said compressor impeller to a stop;
said motor rotor is a permanent magnet rotor; and
said speed reduction feature being at least one of moving a variable diffuser for the fluid rotor to a more open position or opening a valve to deliver air from an outlet of the fluid rotor into an inlet of the fluid rotor.

8. The air supply system as set forth in claim 7, wherein said compressor impeller is configured to deliver air to a downstream use on the aircraft.

9. The air supply system as set forth in claim 8, wherein said downstream use includes delivering air into a cabin for said aircraft.

10. The air supply system as set forth in claim 7, wherein said speed reduction feature is moving the variable diffuser to a more open position.

11. The air supply system as set forth in claim 10, wherein the speed reduction feature also includes opening the valve to port air from an outlet of said compressor impeller into an inlet of said compressor impeller.

12. The air supply system as set forth in claim 7, wherein the speed reduction feature is opening the valve to deliver air from an outlet of said compressor impeller into an inlet of said compressor impeller.

13. The air supply system as set forth in claim 12, wherein said valve is an add heat valve.

14. A method of operating a compressor comprising the steps of:
sensing a fault condition on a permanent magnet electric motor driving a fluid rotor, and stopping supply of current to the electric motor, and actuating a speed reduction feature when a fault is detected to bring rotation of said fluid rotor to a stop; and
said speed reduction feature being at least one of moving a variable diffuser for the fluid rotor to a more open position or opening a valve to deliver air from an outlet of the fluid rotor into an inlet of the fluid rotor.

15. The method of operating a compressor as set forth in claim 14, further comprising delivering air to a downstream use on an aircraft with the fluid rotor.

16. The method of operating a compressor as set forth in claim 14, wherein actuating said speed reduction feature includes opening a flow area in the variable diffuser.

17. The method of operating a compressor as set forth in claim 16, further comprising also opening the valve to deliver air from an outlet of said fluid rotor into an inlet of said fluid rotor as said speed reduction feature.

18. The method of operating a compressor as set forth in claim 14, wherein the speed reduction feature is opening the valve to deliver air from an outlet of said fluid rotor into an inlet of said fluid rotor.

* * * * *